United States Patent Office 3,060,232
Patented Oct. 23, 1962

3,060,232
OXIDATION PROCESS EMPLOYING
SULFONIC ACIDS
William G. Toland, San Rafael, Calif., assignor to California Research Corporation, San Francisco, Calif., a corporation of Delaware
No Drawing. Filed Aug. 7, 1958, Ser. No. 753,654
3 Claims. (Cl. 260—524)

This invention relates to the oxidation of organic compounds using as oxidizing agents compounds comprising sulfur.

Heretofore in processes wherein an organic compound has been oxidized using as an oxidizing agent a compound comprising sulfur, for example a sulfate, the oxidizing agent compound generally has been in a water-soluble inorganic form. In such processes a major difficulty has been caused by the tendency of the organic compound to react with sulfur to form undesirable by-products. This difficulty has had to be met by improving the solubility of the organic compound in the aqueous phase. The solubility has been increased by using large water to organic compound ratios and/or by adding bases such as ammonia. However, the use of bases such as ammonia complicates processing problems by making it necessary to provide treating steps to accomplish amide hydrolysis, for example by treating a reaction product with a strong acid and heating the acidified product to hydrolyze acid amides and liberate free acids. These solutions to the prior art problems necessitate the use of relatively large quantities of base and acid to produce a given amount of a product, for example a carboxylic acid.

The process of the present invention eliminates the need for an inorganic material as the oxidizing agent, and eliminates the need for large volumes of water or bases to improve solubility of the organic compound in the aqueous phase. Further, no treating step is required for amide hydrolysis.

In accordance with the present invention there is provided a process for oxidizing an organic compound containing at least one carbon-to-hydrogen bond, which comprises heating the organic compound, a sulfonic acid, a water-soluble inorganic sulfur compound containing sulfur at a valence below plus 6, and water in a reaction zone at an elevated temperature in the range 400° to 700° F. under a superatmospheric pressure sufficient to maintain a part of the water in liquid phase.

All types of organic compounds appear to undergo oxidation when treated in this manner. Organic compounds containing at least one carbon-to-hydrogen bond, such as aliphatic hydrocarbons, aromatic hydrocarbons, amines, aldehydes, ketones, esters organic acids, and heterocyclic organic compounds are readily oxidized by the process of the invention. The process is especially effective for oxidizing hydrocarbons and organic compounds consisting of carbon, hydrogen and oxygen atoms, and therefore these compounds are preferred.

Although all types of organic compounds are contemplated by the process of the present invention, hydrocarbons and organic compounds consisting of carbon, hydrogen and oxygen atoms are preferred. The most preferred organic compound is an aromatic hydrocarbon having at least one substituent selected from the group consisting of methyl groups and partially oxidized methyl groups.

All types of sulfonic acids, both aromatic and aliphatic, are comprehended by the process of the present invention, with aryl sulfonic acids being preferred. If the aryl nucleus has an alkyl substituent in addition to the sulfonic acid group, it will itself be oxidized, with loss of the sulfonic acid group, and this "self-oxidation" reaction also is comprehended by the process of the present invention, as is the combination of self-oxidation with oxidation with oxidation of a different organic compound.

Although free sulfonic acids are preferred salts of sulfonic acids also are comprehended by the process of the present invention for example the ammonium salt, so long as the resulting system pH is not too basic. For example, at above pH 7 (a more precise figure for a given system and set of reaction conditions being determinable by those skilled in the art), the sulfonate group will not be reduced. Where the unqualified term "sulfonic acid" is used herein, it will be understood to include operable salts thereof.

Although all types of sulfonic acids, both aromatic and aliphatic are contemplated by the process of the present invention, preferably aryl sulfonic acids, the most preferred acid is a sulfonic acid selected from the group consisting of mononuclear and di-nuclear aromatic sulfonic acids, said acid being further selected from the group consisting of unsubstituted acids, acids having no substituents other than methyl groups, and acids having no substituents other than partially oxidized methyl groups.

The self-oxidation aspect of the present invention, the aspect wherein the sulfonic acid is used in the oxidation of a different organic compound, and the combination of these two aspects may be illustrated by the following formulae:

(1) Self-oxidation:

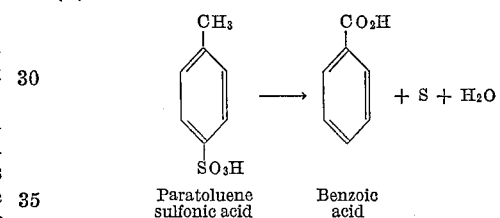

Paratoluene    Benzoic
sulfonic acid   acid (2) Oxidation of a different organic compound:

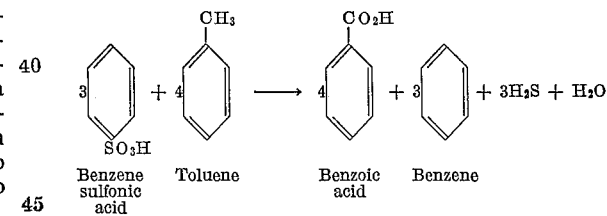

Benzene    Toluene    Benzoic    Benzene
sulfonic              acid
acid (3) Combination of self-oxidation and oxidation of a different organic compound:

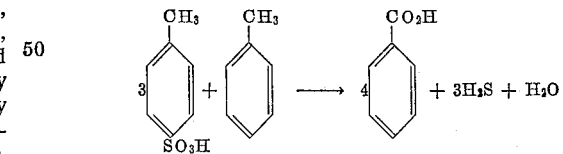

The water-soluble sulfur compound at a valence below plus 6, e.g., $H_2S$, is not shown in the above formulae as being a starting material, because it functions as an initiator or triggering agent for the reaction and when the reaction is started it becomes a product thereof. The compound preferably is an inorganic sulfur compound such as sulfur, sulfur dioxide, a water-soluble sulfite, various water-soluble thiosulfates, and water-soluble sulfides such as hydrogen sulfide, ammonium sulfide, ammonium polysulfide, and the alkali metal sulfides and polysulfides. Of these materials, the sulfides and polysulfides are especially effective and are preferred. The compound is used in a minor amount, for example from about 0.05 to 0.3 mol per mol of methyl group in the organic compound to be oxidized. In the case of hydrogen sulfide, a most preferred trigger, these limitations do not apply because the $H_2S$ will not be reduced during the reaction.

As much as 5.0 mols of H₂S per mol of organic charge has been found to be operable.

The oxidation reaction is conducted at temperatures above 200° F. While there appears to be no definite upper temperature limit for the reaction, it is preferably conducted at from above 200° F. to below the critical temperature of water e.g., from 300° to 700° F., with 400°–650° F. being an especially preferred range.

In the preferred mode of operation of the invention, the oxidation reaction is conducted at an elevated pressure sufficient to maintain a part of the water in the reaction zone in liquid phase, desirably at from 200 to 5000 p.s.i.g.

The vigor and completeness of the oxidation reaction increases with temperature and the completeness of the oxidation of the organic compound tends to increase with reaction time. The extent of the oxidation with many organic compounds is controllable by varying time, ratio of reactants, and temperature of the reaction.

The oxidation may be conducted either batchwise or in a continuous process. When batch operation is employed, the organic compound, the sulfonic acid, the sulfide and water are introduced into a bomb or an autoclave which is then sealed and heated to reaction temperature with shaking to facilitate contact of the reactants. The size of the bomb is so related to the quantity of the reactants introduced that an autogenous pressure in the range 200 to 5000 p.s.i.g. is built up. After the reactants have been held at reaction temperature for a time sufficient to effect the desired degree of oxidation of the organic compound, the bomb may be cooled, depressured, and the reaction product removed. The reaction may also be run continuously, in which case a tubular reaction zone is employed. The reactants are passed through an elongated heated tube at reaction temperature and under an elevated pressure and the reaction products are continuously withdrawn from the reaction zone and purified.

The process of the present invention may be further understood from the following example:

*Example*

A 4.5 liter autoclave was charged with 900 cc. (50 mols) of water, 190 grams (1 mol) of paratoluene sulfonic acid monohydrate, practical grade, and 41 grams (1.2 mols) of H₂S.

The autoclave was sealed and, while being shaken, was heated to 600° F. and held at that temperature for one hour. At the end of the one-hour period the pressure was 1775 p.s.i.g. The autoclave was cooled and gaseous products were bled through a caustic scrubber, the weight of which increased 9 grams during the bleeding process. The crude products from the autoclave, in the form of a pale green aqueous solution containing white, yellow and black solids, were filtered. The filtrate contained 8 grams of toluene. The filter cake was extracted with bicarbonate to remove acidic products from sulfur. The bicarbonate extract was adjusted to pH 7, filtered to remove a small amount of dark precipitate, carbon treated, and then acidified at room temperature to liberate the benzoic acid. The acidified extract was filtered, washed and dried to give a 61.6% of theory yield of benzoic acid having a neutral equivalent of 125.3.

It will be noted that the process of the present invention has applicability in situations where a substituted aromatic sulfonic acid has self-oxidizing capability, but this capability is insufficient for complete oxidation of the substituents of the acid, in which case a different sulfonic acid may be utilized to contribute the additional oxidizing capability. For example, a xylene sulfonic acid may have its methyl substituents only partially oxidized by means of the self-oxidation reaction, and in such case a different sulfonic acid, for example benzene sulfonic acid, may be added so that it can contribute its oxidizing capability to the reaction and thus cause the oxidation of the methyl substituents of the xylene sulfonic acid to be completed.

What is claimed is:

1. A process for oxidizing a material selected from the group consisting of (1) toluene sulfonic acid, (2) xylene sulfonic acid, and (3) mixtures of toluene with a member selected from the group consisting of benzene sulfonic acid and toluene sulfonic acid, which comprises heating said material in the presence of water and of a minor amount of a reaction initiating water-soluble inorganic sulfur compound containing sulfur at a valence below +6 at a temperature from 300° to 700° F. under a superatmospheric pressure sufficient to maintain part of the water in liquid phase, and recovering the resulting oxidation product mixture.

2. A process for the production of benzoic acid which comprises heating toluene sulfonic acid and water in the presence of a minor amount of a reaction initiating water-soluble inorganic compound containing sulfur at a valence below +6 at an elevated temperature in the range from 400–650° F. under a superatmospheric pressure sufficient to maintain part of the water in liquid phase, and recovering the resulting oxidation reaction product mixture containing benzoic acid.

3. A process for the oxidation of xylene sulfonic acid which comprises heating said acid and water in the presence of a minor amount of a reaction initiating water-soluble inorganic sulfur compound containing sulfur at a valence below +6, said heating being conducted at a temperature in the range from 400° to 650° F. under a superatmospheric pressure sufficient to maintain part of the water in liquid phase, and recovering the resulting oxidation reaction product mixture.

References Cited in the file of this patent

UNITED STATES PATENTS

| | | |
|---|---|---|
| 2,824,893 | Toland | Feb. 25, 1958 |
| 2,856,424 | Toland | Oct. 14, 1958 |
| 2,900,412 | Toland | Aug. 18, 1959 |

OTHER REFERENCES

Rodd: Chemistry of Carbon Compounds, vol. IIIA, pp. 231, 234, 236, and 237 (1954).